(12) United States Patent
Balmakhtar et al.

(10) Patent No.: US 9,654,465 B2
(45) Date of Patent: May 16, 2017

(54) SOFTWARE-DEFINED NETWORK THREAT CONTROL

(71) Applicant: Sprint Communications Company L.P., Overland Park, KS (US)

(72) Inventors: Marouane Balmakhtar, Alexandria, VA (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 22 days.

(21) Appl. No.: 14/872,578

(22) Filed: Oct. 1, 2015

(65) Prior Publication Data
US 2017/0099284 A1 Apr. 6, 2017

(51) Int. Cl.
*H04L 12/24* (2006.01)
*H04L 29/06* (2006.01)
(Continued)

(52) U.S. Cl.
CPC ...... *H04L 63/0823* (2013.01); *H04L 41/0803* (2013.01); *H04L 41/28* (2013.01);
(Continued)

(58) Field of Classification Search
None
See application file for complete search history.

(56) References Cited

U.S. PATENT DOCUMENTS

| 7,757,276 | B1* | 7/2010 | Lear | G06F 21/572 726/10 |
| 2008/0155277 | A1* | 6/2008 | Bulusu | G06F 21/57 713/193 |

(Continued)

FOREIGN PATENT DOCUMENTS

| WO | 2014106028 A1 | 7/2014 |
| WO | 2015065422 A1 | 5/2015 |

OTHER PUBLICATIONS

Hu et al.; "FlowGuard: Building Robust Firewalls for Software-Defined Networks"; 2014; Retrieved from the Internet <URL: http://dl.acm.org/citation.cfm?id=2620749>; pp. 1-6 as printed.*

(Continued)

*Primary Examiner* — Saleh Najjar
*Assistant Examiner* — Michael Chao

(57) ABSTRACT

In Software-Defined Network (SDN), a trust controller and trust processor exchange hardware-trust data over an SDN southbound interface to maintain hardware-trust. A flow controller transfers a Flow Description Table (FDT) modification to the data-plane machine over the southbound interface. The flow controller transfers an FDT modification notice to the trust controller which transfers FDT security data over the southbound interface to authorize the FDT change in the SDN data-plane machine. The data-plane machine authorizes the FDT modification based on the FDT security data from the trust controller. The data-plane machine modifies the FDT in response to the successful authorization and processes user data traffic using the modified FDT. The trust controller may also transfer a Threat Description Table (TDT) to the data-plane machine to filter the user traffic for other threats.

20 Claims, 7 Drawing Sheets

(51) Int. Cl.
*H04L 12/721* (2013.01)
*G06F 21/60* (2013.01)
*G06F 21/57* (2013.01)

(52) U.S. Cl.
CPC .......... *H04L 45/38* (2013.01); *H04L 63/0254* (2013.01); *H04L 63/0876* (2013.01); *H04L 63/1441* (2013.01); *H04L 63/166* (2013.01); *G06F 21/577* (2013.01); *G06F 21/604* (2013.01)

(56) References Cited

U.S. PATENT DOCUMENTS

| | | |
|---|---|---|
| 2014/0109190 A1 | 4/2014 | Cam-Winget et al. |
| 2014/0211661 A1 | 7/2014 | Gorkemli et al. |
| 2014/0359697 A1 | 12/2014 | Ji |
| 2015/0089566 A1 | 3/2015 | Chesla |
| 2015/0172208 A1 | 6/2015 | DeCusatis et al. |

OTHER PUBLICATIONS

Shin et al.; "FRESCO: Modular Composable Security Services for Software-Defined Networks"; 2013; Retrieved from the Internet <URL: http://www.csl.sri.com/users/vinod/papers/fresco.pdf>; pp. 1-16 as printed.*

Yan et al.; "A security and trust framework for virtualized networks and software-defined networking"; Mar. 2015; Retrieved from the Internet <URL: http://onlinelibrary.wiley.com/doi/10.1002/sec.1243/pdf>; pp. 1-11 as printed.*

No stated author; OpenFlow Switch Specification V 1.3.2; 2013; Retrieved from the Internet <URL: https://www.opennetworking.org/images/stories/downloads/sdn-resources/onf-specifications/openflow/openflow-spec-v1.3.2.pdf>; pp. 1-131 as printed.*

Ludovic Jacquin, et al.; "Towards Trusted Software-Defined Networks using a Hardware-based Integrity Measurement Architecture;" Proceedings of the 2015 1st IEEE Conference on Network Softwarization (Netsoft); Apr. 13, 2015; pp. 1-6; IEEE.

* cited by examiner

SOFTWARE-DEFINED NETWORK THREAT CONTROL

TECHNICAL BACKGROUND

Data communication networks provide data services like internet access, media conferencing, file access, messaging, content delivery, and the like. These data communication networks are made of computer systems and networking components like transceivers, antennas, and cabling. The computer systems include processing circuitry and associated memories that store and execute software.

The data communication networks are implementing Software-Defined Network (SDN) technology to improve service delivery and efficiency. The SDN systems have separate data and control planes that communicate over a southbound data interface. The data plane has router-like devices called flow machines that process user data packet flows based on Flow Description Tables (FDTs). A typical FDT entry may associate an Internet protocol (IP) prefix with a data action such as forwarding, storing, or blocking. The control plane has flow controllers that load and modify the FDTs to control the user data flows. The controllers in the control plane interact with SDN applications in the control plane to transfer and manage the user data flows.

Unfortunately, an SDN data-plane machine may modify an FDT due to a mistake or a malicious act. The corrupted FDT may seriously impact user data services. In addition, the data-plane machine may receive viruses or some other type of bad content. Moreover, the SDN controllers and data-plane machines may be spoofed by criminal elements. Various techniques to implement hardware-trust are available. For instance, public/private key exchanges and digital certificates are used to build hardware-trust between different computer systems and users. Other techniques use random number challenges and hardware-key based answers to build hardware-trust between various computer systems and users.

TECHNICAL OVERVIEW

In a Software-Defined Network (SDN), a trust controller and trust processor exchange hardware-trust data over an SDN southbound interface to maintain hardware-trust. A flow controller transfers a Flow Description Table (FDT) modification to the data-plane machine over the southbound interface. The flow controller transfers an FDT modification notice to the trust controller which transfers FDT security data over the southbound interface to authorize the FDT change in the SDN data-plane machine. The data-plane machine authorizes the FDT modification based on the FDT security data from the trust controller. The data-plane machine modifies the FDT in response to the successful authorization and processes user data traffic using the modified FDT.

DETAILED DESCRIPTION

Figure 1:
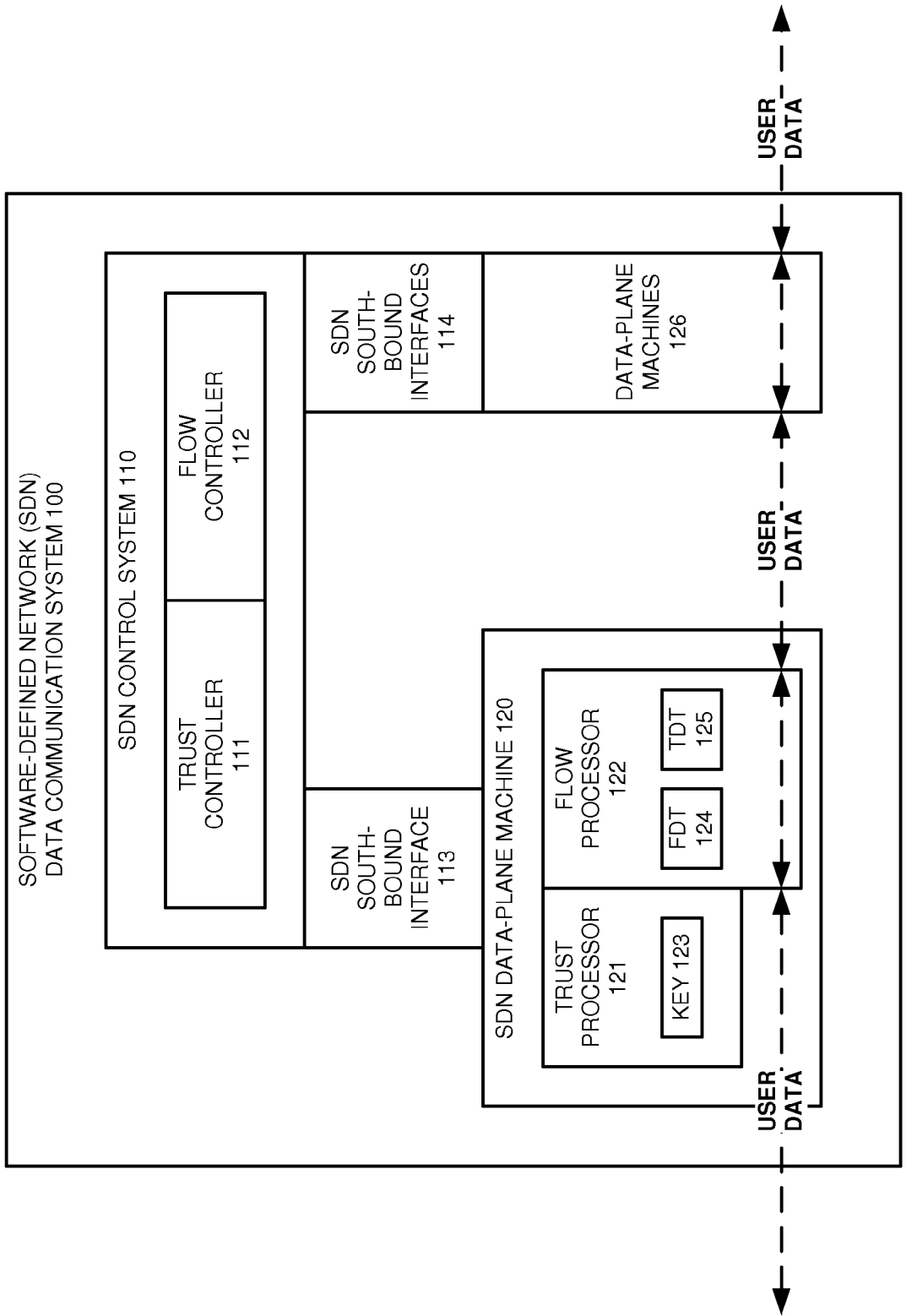
FIG. 1 illustrates a Software-Defined Network (SDN) data communication system to process user data traffic with hardware-trust.

FIG. 1 illustrates Software-Defined Network (SDN) data communication system 100 to process user data traffic with hardware-trust. The user data traffic comprises media conferencing, multimedia messaging, media streaming, internet access, or some other type of data communications. SDN data communication system 100 comprises SDN control system 110, SDN southbound interfaces 113-114, and SDN data-plane machines 120 and 126. SDN control system 110 comprises trust controller 111 and flow controller 112. SDN data-plane machine 120 comprises trust processor 121 and flow processor 122. Trust processor 121 has a hardware security key 123. Flow processor 122 includes Flow Description Table (FDT) 124 and a Threat Description Table (TDT) 125.

SDN control system 110 comprises a computer system that includes data Input/Output (I/O) transceivers, processing circuitry, data storage memories, and software. Controllers 111-112 comprise portions of these components. Controllers 111-112 control data-plane machines 120 and 126 over southbound interfaces 113-114.

SDN data-plane machine 120 comprises a computer system that includes data I/O transceivers, processing circuitry, data storage memories, and software. Processors 121-122 comprise portions of these components. Processors 121-122 are driven by SDN controllers 111-112 over southbound interface 113. SDN data-plane machines 126 are similar to data-plane machine 120.

Southbound interface 113 comprises data networking media, nodes, and protocols that transport SDN signaling between control system 110 and data-plane-machines 120 and 126. The media comprises glass, metal, air, space, and the like. The nodes comprise data-plane machines, wireless access points, virtualized servers, and the like. The protocols comprise Ethernet, Internet Protocol (IP), Wave Division Multiplexing (WDM), Orthogonal Frequency Division Multiplexing (OFDM), Data Over Cable Service Information Specification (DOCSIS), and the like.

In operation, trust controller 111 transfers hardware-trust data to trust processor 121 in SDN data-plane machine 120 over SDN southbound interface 113 to maintain hardware-trust with SDN data-plane machine 120. In SDN data-plane machine 120, trust processor 121 transfers hardware-trust data to trust controller 111 over southbound interface 113 to maintain its hardware trust with SDN control system 110. In some examples, the hardware-trust data comprises random challenges and key-encoded hash results. In other examples, the hardware-trust data comprises digital certificates from appropriate certificate authorities.

In SDN control system 110, flow controller 112 identifies a modification to FDT 124 in data-plane machine 120. Flow controller 112 transfers an FDT modification notice to trust controller 111 characterizing the FDT modification. Responsive to the FDT modification notice from flow controller 112, trust controller 111 transfers FDT security data to trust processor 121 over southbound interface 113 to authorize the FDT change. Flow controller 112 transfers the FDT modification over southbound interface 113 to flow processor 122.

In SDN data-plane machine 120, trust processor 121 transfers FDT authorization data to flow processor 122 responsive to the FDT security data from trust controller 111. Flow processor 122 authorizes the FDT modification based on the FDT authorization data from trust processor 121. In response to the successful FDT authorization, flow processor 122 modifies FDT 124 based on the FDT modification from flow controller 112. For example, FDT 124 can be modified to forward an IP prefix to a different output port. In response to an unsuccessful FDT authorization, flow processor 122 should not modify FDT 124. Flow processor 122 processes user data traffic using the modified FDT. Typically, flow processor 122 forwards the user data traffic based on its packet address or flow ID based on FDT 124.

In some examples, trust controller 111 receives a flow threat notice from SDN data-plane machines 126 indicating that a threat has been detected in a user data packet flow. In response, trust controller 111 transfers threat data over southbound interface 113 to trust processor 121 to modify TDT 125 and isolate the threat. Trust processor 121 transfers the threat data to flow processor 122. Flow processor 122 modifies TDT 125 in response to the threat data. For example, TDT 125 may be changed to associate an IP prefix with a block and quarantine instruction. Flow processor 122 filters the user data traffic using the modified TDT. For example, flow processor 122 may block and quarantine the threatening flow data based on the IP prefix and TDT 125. In addition, flow processor 122 may quarantine another threatening flow of data that matches a virus signature in TDT 125. In some examples, TDT 125 is a part of FDT 124, such as columns of TDT actions associated with various rows of FDT flows.

In some examples, trust controller 111 receives a notice that a data-plane machine has failed a hardware-trust validation. For example, the failed machine may provide an invalid digital certificate or an incorrect answer to a random trust challenge. In response to the notice, trust controller 111 transfers a notice for the failed data-plane machine to trust processor 121 over southbound interface 113. Trust processor 121 notifies flow processor 122 of the failed data-plane machine. Flow processor 122 then avoids, quarantines, and/or blocks interactions with the failed data-plane machine. For example, flow processor 122 may be directly coupled to a failed machine and would quarantine all data on the physical port to the failed machine.

In some examples, trust controller 111 receives a notice that a flow controller has failed to authorize an FDT modification. For example, the failed controller may transfer an FDT modification to a data-plane machine without notifying any trust controller. In response to the notice, trust controller 111 transfers a notice for the failed flow controller to trust processor 121 over southbound interface 113. Trust processor 121 notifies flow processor 122 of the failed flow controller. Flow processor 122 then blocks and quarantines data exchanges with the failed flow controller.

Figure 2:
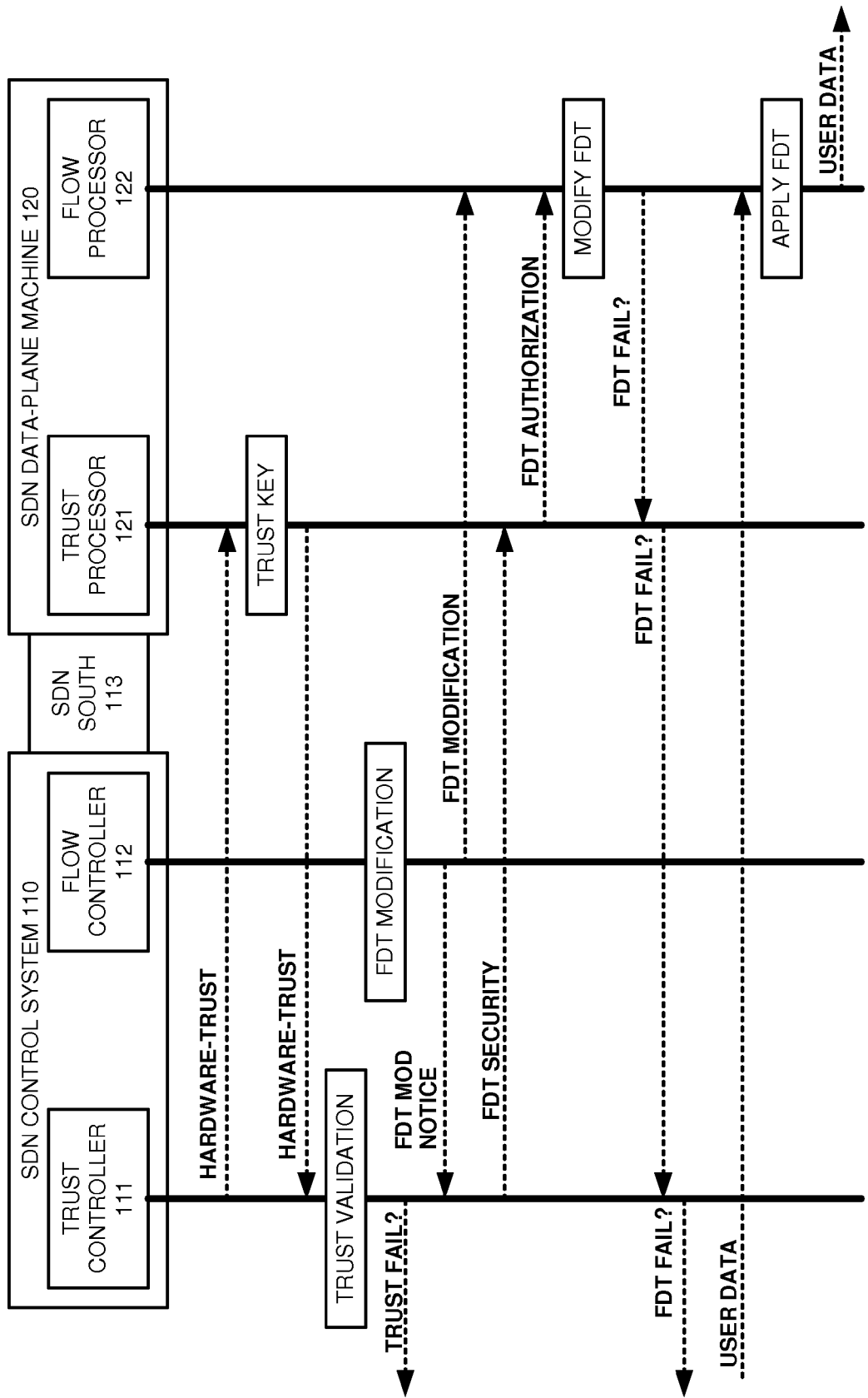
FIG. 2 illustrates the operation of an SDN data communication system to modify a Flow Description Table (FDT) to process user data traffic.

FIG. 2 illustrates the operation of SDN data communication system 100 to modify FDT 124 to process user data traffic. Trust controller 111 transfers hardware-trust data to trust processor 121 to maintain hardware-trust. Trust processor 121 also transfers hardware-trust data to trust controller 111 to maintain the hardware trust. Trust processor 121 uses its trust key to respond to trust controller 111, and the hardware-trust data might be challenges/results, digital certificates, or some other type of hardware authentication information. Trust controller 111 uses its version of the trust key or key pair to validate the hardware trust. If the hardware trust validation were to fail, then trust controller 111 transfers failure notices to other trust controllers and data-plane machines.

Flow controller 112 identifies a modification to FDT 124. In response, flow controller 112 transfers an FDT modification notice to trust controller 111 that characterizes the FDT modification. Responsive to the FDT modification notice from flow controller 112, trust controller 111 transfers FDT security data to trust processor 121 to authorize the FDT change. Flow controller 112 transfers the FDT modification to flow processor 122.

Trust processor 121 transfers FDT authorization data to flow processor 122 in response to the FDT security data from trust controller 111. Flow processor 122 authorizes the FDT modification based on the FDT authorization data from trust processor 121. In response to the successful FDT authorization, flow processor 122 modifies FDT 124 based on the FDT modification from flow controller 112. For example, FDT 124 may be modified to forward an IP prefix to a different output port.

Flow processor 122 processes user data traffic using the modified FDT. Typically, flow processor 122 forwards the user data traffic based on its packet address or flow ID based on FDT 124. In response to an unsuccessful FDT authorization, flow processor 122 does not modify FDT 124. Instead, flow processor 122 transfers an FDT notice that characterizes the failure to trust processor 121, and trust processor 121 transfers the notice to trust controller 111. Trust controller 111 transfers failure notices to other trust controllers and data-plane machines.

Figure 3:
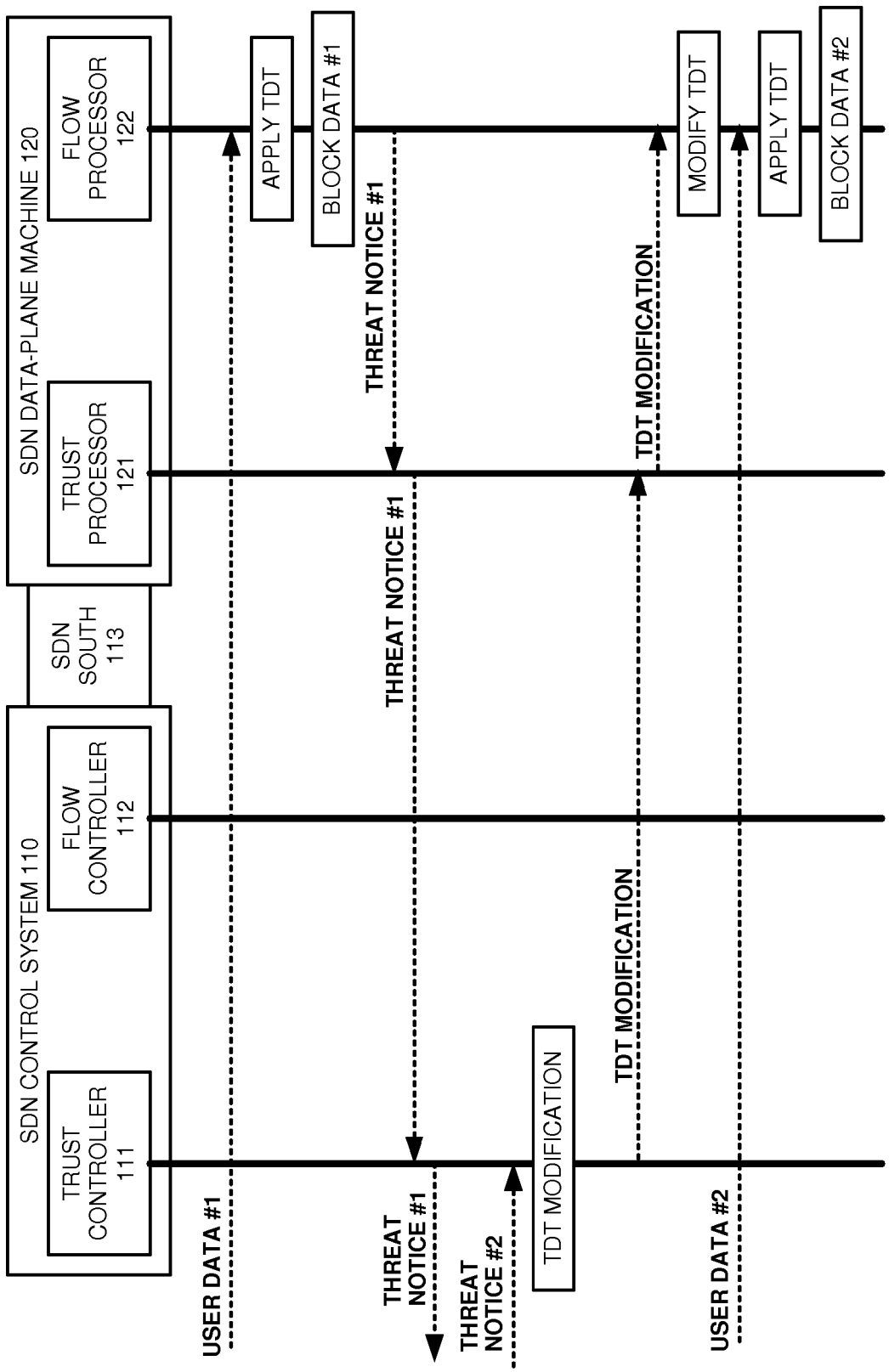
FIG. 3 illustrates the operation of an SDN data communication system to modify a Threat Description Table (TDT) to filter user data traffic.

FIG. 3 illustrates the operation of SDN data communication system 100 to modify TDT 125 to filter user data traffic. Flow processor 122 receives and filters user data #1 based on TDT 125. In this example, a virus signature stored in TDT 125 matches user data #1 and the corresponding TDT action is to block user data #1. In addition, flow processor 122 transfers a threat notice to trust processor 121 that characterizes the threat. Trust processor 121 transfers the threat notice to trust controller 111, and trust controller 111 transfers the threat notice to other trust controllers and data-plane machines.

Trust controller 111 then receives a second threat notice from another trust controller or data-pane machine indicating that a second threat has been detected in a user data flow. In response, trust controller 111 generates a TDT modification for the threat and transfers the TDT modification to trust processor 121. Trust processor 121 forwards the TDT modification to flow processor 122. In response to the TDT modification, flow processor 122 modifies TDT 125. Flow processor 122 then filters user data #2 using the modified TDT. In this example, flow processor 122 blocks user data #2 based on modified TDT 125.

Figure 4:
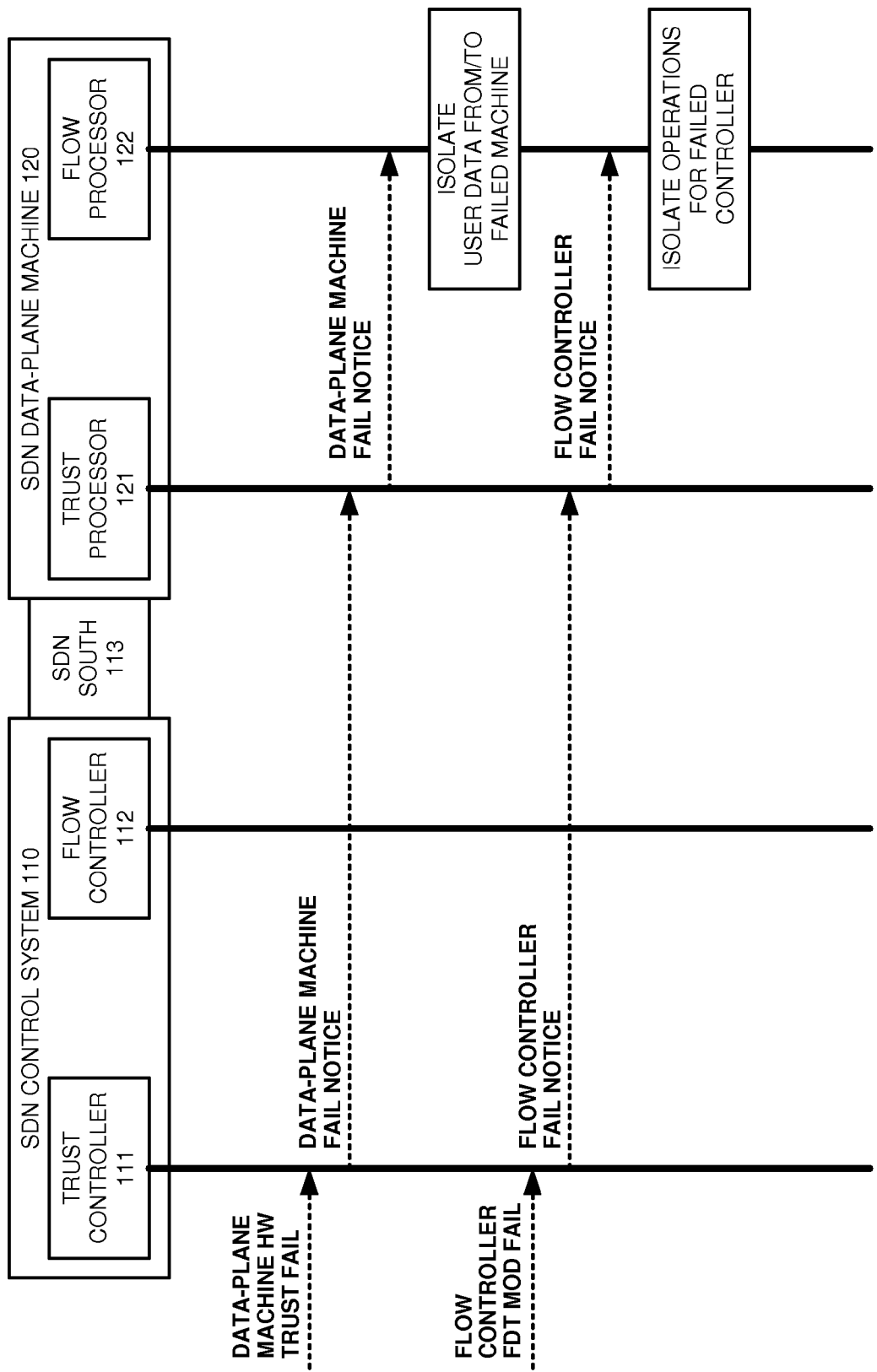
FIG. 4 illustrates the operation of an SDN data communication system to identify and isolate unauthorized flow controllers and untrusted data-plane machines.

FIG. 4 illustrates the operation of SDN data communication system 100 to identify and isolate unauthorized flow controllers and untrusted data-plane machines. Trust controller 111 receives a notice that a data-plane machine has failed a hardware-trust validation. FIG. 2 illustrates the failure and generation of such a notice. In response to the notice, trust controller 111 transfers a notice for the failed data-plane machine to trust processor 121. Trust processor 121 notifies flow processor 122 of the failed data-plane machine. Flow processor 122 then isolates data exchanges with the failed data-plane machine.

Trust controller 111 then receives a notice that a flow controller has failed to authorize an FDT modification. FIG.

2 illustrates the failure and generation of such a notice. In response to the notice, trust controller 111 transfers a notice for the failed flow controller to trust processor 121. Trust processor 121 notifies flow processor 122 of the failed flow controller. Flow processor 122 then isolates data exchanges with the failed flow controller.

Figure 5:
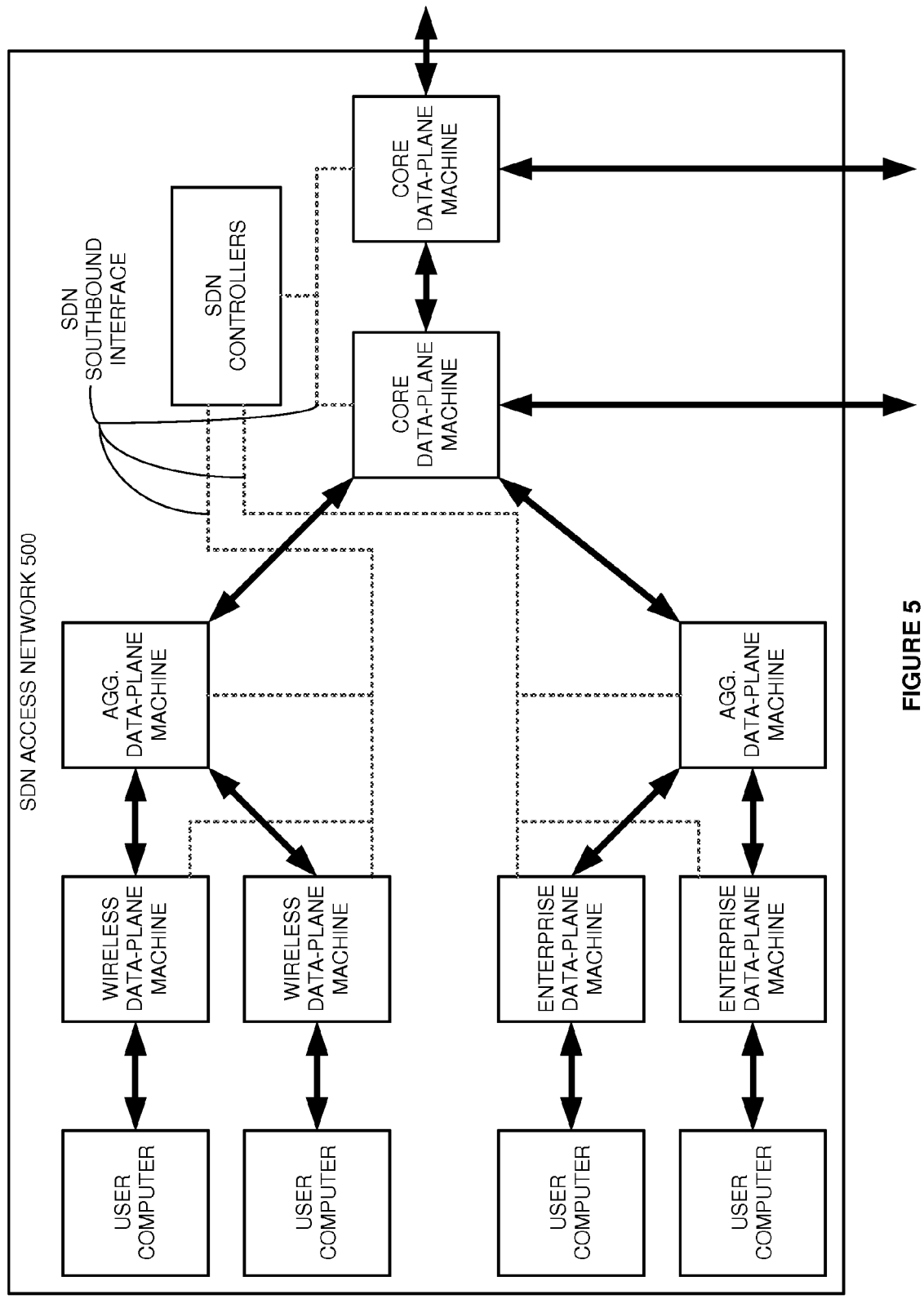
FIG. 5 illustrates an SDN access network to support hardware trust and process user data traffic.

FIG. 5 illustrates SDN access network 500 to support hardware trust and process user data traffic. Multiple user computers exchange user data with data-plane machines as indicated by the arrows on FIG. 5. Some of the user computers are coupled to wireless access data-plane machines. For example, many smartphones may be wirelessly coupled to data-plane machines over a Long Term Evolution (LTE) network. Some user computers are coupled to enterprise data-plane machines. For example, manufacturing robots may be optically coupled to data-plane machines in an automobile plant.

Based on their FDTs and TDTs, the wireless data-plane machines and the enterprise data-plane machines exchange user data with one another and with Aggregation (Agg.) data-plane machines. The aggregation data-plane machines exchange user data with one another and with a core data-plane machine based on their FDTs and TDTs. The core data-plane machine exchanges the user data with other data-plane machines or with external systems based on its FDTs and TDTs.

The data-plane machines and SDN controllers exchange SDN signaling over the SDN southbound interface to maintain hardware-trust and to control the FDTs and TDTs. To maintain hardware-trust, the SDN controllers transfer random numbers to the data-plane machines over the southbound interface. The data-plane machines return encoded results over the southbound interface based on their physically-embedded and read-only hardware identifiers. The SDN controllers verify the results based on their own version of the numbers, keys, and hash algorithms. Should any data-plane machine fail to maintain hardware-trust, then the SDN controllers notify one another and the other data-plane machines to initiate isolation. The SDN controllers also modify FDTs and TDTs over the southbound interface to manage the hardware-trust failures.

The SDN controllers generate and transfer modifications to the FDTs in the data-plane machines over the southbound interface. The SDN controllers also generate and transfer authorizations for the FDT modifications to the data-plane machines over the southbound interface. The data-plane machines first authorize the FDT modifications based on the FDT authorizations. In response to the successful authorization, the data-plane machines modify their FDTs based on the FDT modifications from the SDN controllers. The data-plane machines then process the user data (the arrows) based on the modified FDTs. Should any SDN controller or data-plane machine modify an FDT without authorization, then the SDN controllers will notify one another and the data-plane machines to initiate isolation. The SDN controllers also modify FDTs and TDTs to manage the FDT failures.

When data-plane machines detect a threat like a virus or bad IP prefix, then the data-plane machines report the threat to the SDN controllers over the southbound interface. The SDN controllers aggregate the threat reports and broadcast threat notices over the southbound interface to initiate isolation. The SDN controllers also modify FDTs and TDTs to manage the threats.

Figure 6:
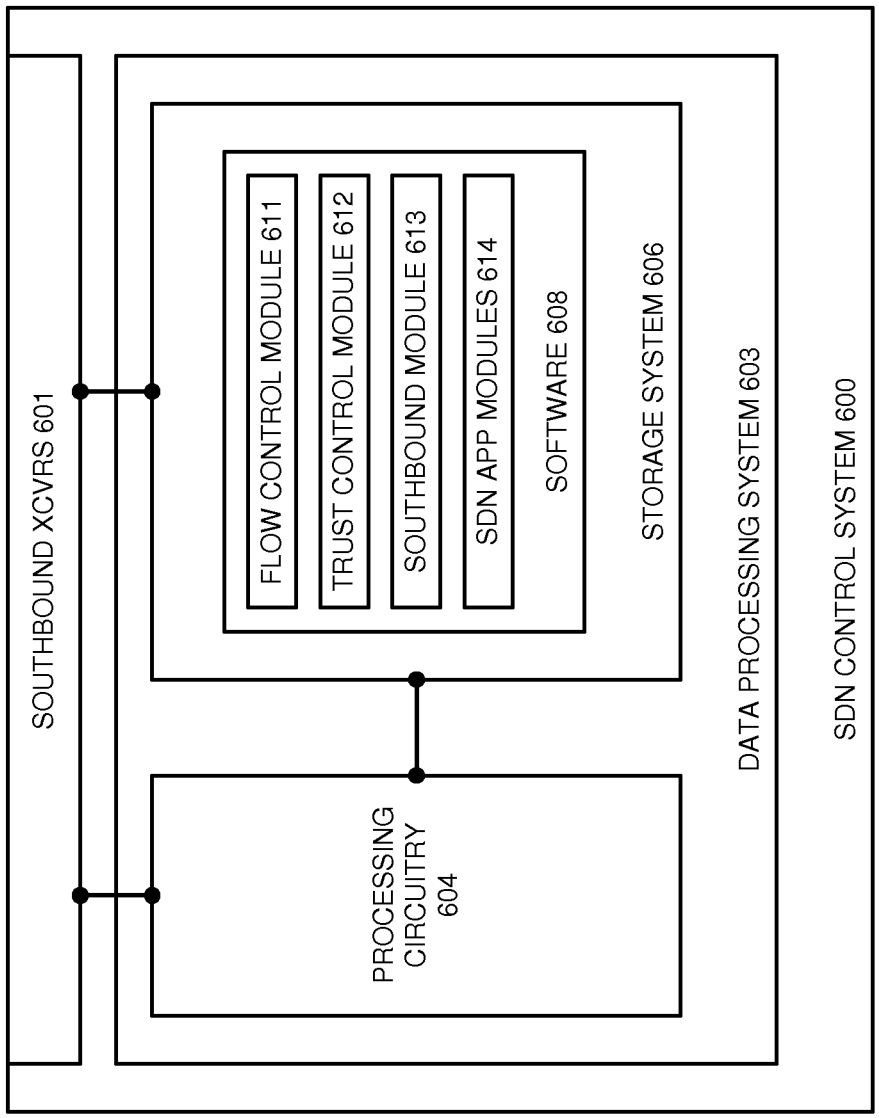
FIG. 6 illustrates an SDN control system to support hardware trust and control SDN data-plane machines.

FIG. 6 illustrates SDN control system 600 to support hardware trust and control SDN data-plane machines. SDN control system 600 is an example of systems 110 and 500, although these systems may use alternative configurations and operations. SDN control system 600 comprises southbound transceivers 601. Southbound transceivers 601 comprise communication components, such as ports, bus interfaces, signal processors, memory, software, and the like. Southbound transceivers 601 exchange SDN signaling with SDN data plane machines and other controllers.

SDN control system 600 comprises data processing system 603. Data processing system 603 comprises processing circuitry 604 and storage system 606. Storage system 606 stores software 608. Software 608 includes software modules 611-614. Some conventional aspects of SDN control system 600 are omitted for clarity, such as power supplies, enclosures, and the like. SDN control system 600 may be centralized or distributed.

In data processing system 603, processing circuitry 604 comprises server blades, circuit boards, bus interfaces, integrated circuitry, and associated electronics. Processing circuitry 604 comprises Central Processing Units (CPUs) with associated cache and bus structures. Storage system 606 comprises non-transitory, machine-readable, data storage media, such as flash drives, disc drives, memory circuitry, servers, and the like. Software 608 comprises machine-readable instructions that control the operation of processing circuitry 604 when executed. Software 608 includes software modules 611-614 and may also include operating systems, applications, data structures, virtual network elements, utilities, and the like. All or portions of software 608 may be externally stored on one or more storage media, such as circuitry, discs, and the like.

When executed by processing circuitry 604, flow control module 611 directs circuitry 604 to manage data flows by directing FDT modifications as described herein. When executed by processing circuitry 604, trust control module 612 directs circuitry 604 to maintain hardware trust, manage threats, and authorize FDT/TDT modifications as described herein. When executed by processing circuitry 604, southbound module 613 direct circuitry 604 to exchange SDN signaling over southbound transceivers 601. When executed by processing circuitry 604, SDN application module 614 directs circuitry 604 to transfer networking instructions, including FDT and TDT modifications, to flow control module 611.

Figure 7:
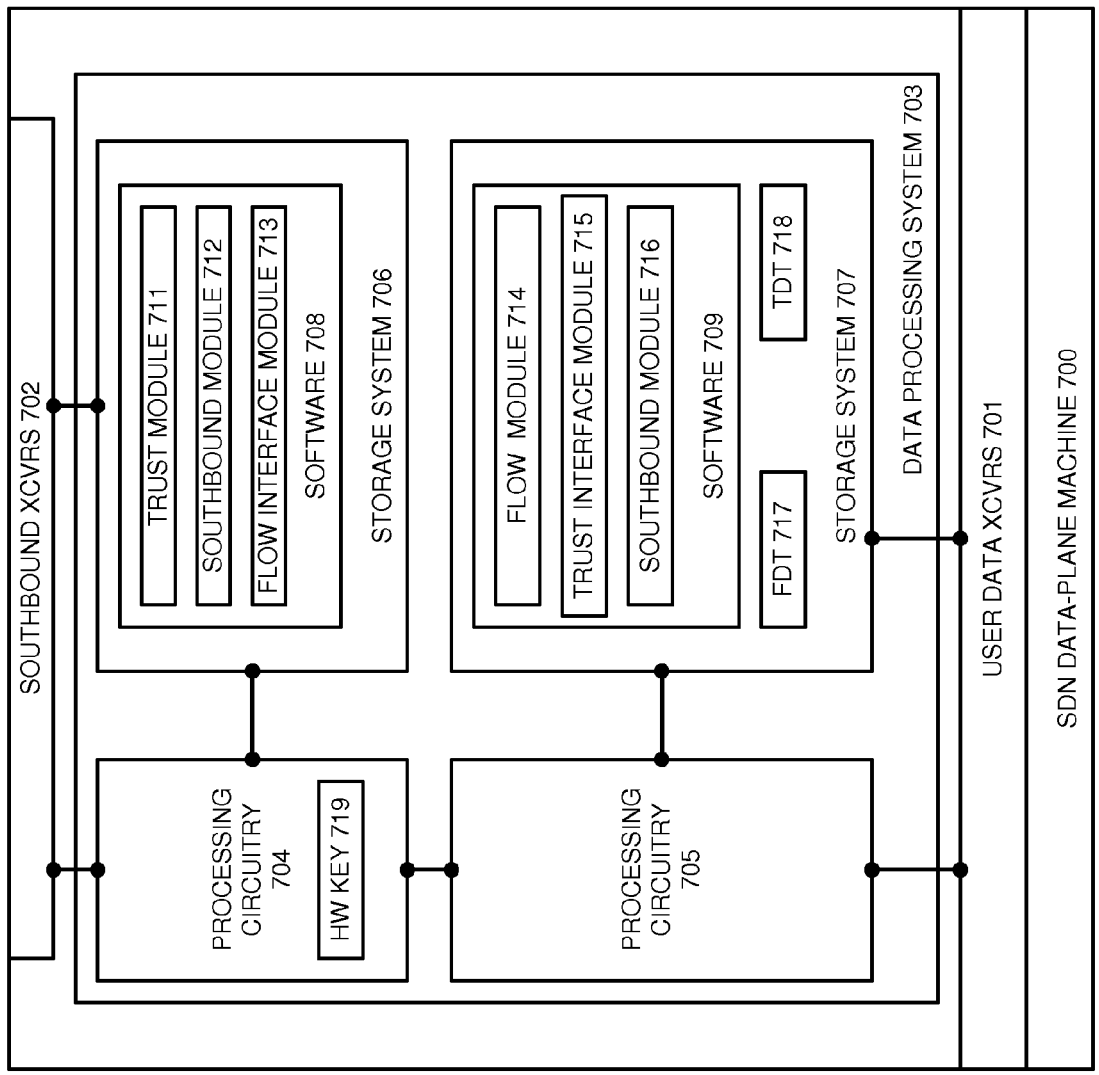
FIG. 7 illustrates an SDN data-plane machine to support hardware trust and process user data traffic.

FIG. 7 illustrates SDN data-plane machine 700 to support hardware trust and process user data traffic. SDN data-plane machine 700 is an example of systems 120, 126, and 500, although these systems may use alternative configurations and operations. SDN data-plane machine 700 comprises user data transceivers 701 and southbound transceivers 702.

Transceivers 701-702 comprise communication components, such as ports, bus interfaces, signal processors, memory, software, and the like. User data transceivers 701 exchange user data packets with user devices and other data plane machines. Southbound transceivers 702 exchange SDN signaling with SDN controllers and other data plane machines.

SDN data-plane machine 700 comprises data processing system 703. Data processing system 703 comprises processing circuitry 704-705 and storage systems 706-707. Storage systems 706-707 store respective software 708-709. Software 708-709 includes respective software modules 711-713 and 714-716. Some conventional aspects of SDN data-plane machine 700 are omitted for clarity, such as power supplies, enclosures, and the like. SDN data-plane machine 700 may be centralized or distributed.

In data processing system 703, processing circuitry 704-705 comprises server blades, circuit boards, bus interfaces, integrated circuitry, and associated electronics. Processing circuitry 704-705 comprises CPUs with associated cache and bus structures. Processing circuitry 704 has a physically-embedded, read-only hardware-trust key 719. Processing circuitry 705 communicates with southbound transceivers 702 through trusted processing circuitry 704. Storage systems 706-707 comprise non-transitory, machine-readable, data storage media, such as flash drives, disc drives, memory circuitry, servers, and the like. Storage system 707 stores FDT 717 and TDT 718.

Software 708-709 comprises machine-readable instructions that control the operation of processing circuitry 704-705 when executed. Software 708-709 includes software modules 711-616 and may also include operating systems, applications, data structures, virtual network elements, utilities, and the like. All or portions of software 711-716 may be externally stored on one or more storage media, such as circuitry, discs, and the like.

When executed by processing circuitry 704, trust module 711 directs circuitry 704 to maintain hardware-trust using key 719, manage threat traffic and support the modification of FDT 717 and TDT 718. When executed by processing circuitry 704, southbound module 712 directs circuitry 704 to exchange SDN signaling over southbound transceivers 702. When executed by processing circuitry 704, flow interface module 713 direct circuitry 704 to exchange FDT authorizations, TDT modifications, and threat data with trust interface module 715.

When executed by processing circuitry 705, flow module 714 directs circuitry 705 to process and filter user data based on FDT 717 and TDT 718. When executed by processing circuitry 705, trust interface module 715 directs circuitry 705 to exchange FDT authorizations, TDT modifications, and threat data with flow interface module 713. When executed by processing circuitry 705, southbound module 716 directs circuitry 705 to exchange SDN signaling over southbound transceivers 702.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Software-Defined Network (SDN) data communication system to support hardware-trust and process user data traffic, the method comprising:
   in an SDN control system, a trust controller transferring hardware-trust data to a trust processor in an SDN data-plane machine over an SDN southbound interface to maintain hardware-trust with the SDN data-plane machine;
   in the SDN data-plane machine, the trust processor transferring additional hardware-trust data to the trust controller over the SDN southbound interface to maintain the hardware trust with the SDN control system;
   in the SDN control system, a flow controller transferring a Flow Description Table (FDT) modification to a flow processor in the SDN data-plane machine over the SDN southbound interface and transferring an FDT modification notice to the trust controller;
   in the SDN control system, the trust controller transferring FDT security data to the trust processor over the SDN southbound interface to authorize an FDT change responsive to the FDT modification notice;
   the trust processor transferring FDT authorization data to the flow processor responsive to the FDT security data from the trust controller; and
   in the SDN data-plane machine, the flow processor authorizing the FDT modification based on the FDT authorization data from the trust processor, modifying an FDT based on the FDT modification and in response to the successful FDT authorization, and processing the user data traffic using the modified FDT.

2. The method of claim 1 further comprising:
   in the SDN control system, the trust controller transferring threat data over the SDN southbound interface to the trust processor;
   in the SDN data-plane machine, the trust processor transferring the threat data to the flow processor; and
   in the SDN data-plane machine, the flow processor modifying a Threat Description Table (TDT) responsive to the threat data and filtering the user data traffic using the modified TDT.

3. The method of claim 2 wherein processing the user data traffic based on the FDT comprises forwarding a first flow of user data packets.

4. The method of claim 2 wherein filtering the user data traffic based on the TDT further comprises blocking a second flow of user data packets.

5. The method of claim 4 further comprising the trust controller receiving a flow threat notice from another SDN data-plane machine indicating a detected threat from the second flow of the user data packets and wherein transferring the threat data to modify the TDT comprises transferring the threat data in response to the flow threat notice.

6. The method of claim 4 wherein the TDT comprises a portion of the FDT.

7. The method of claim 1 further comprising the trust controller transferring an SDN data-plane machine notice to the trust processor over the SDN southbound interface responsive to a hardware-trust failure of another SDN data-plane machine.

8. The method of claim 1 further comprising the trust controller transferring an SDN flow controller notice to the trust processor over the SDN southbound interface responsive to an unauthorized FDT modification attempt associated with another SDN flow controller.

9. The method of claim 1 wherein:
   transferring the hardware-trust data comprises the trust controller transferring a random code over the SDN southbound interface to the trust processor; and
   transferring the additional hardware-trust data comprises the trust processor reading a physically-embedded hardware-trust key, processing the hardware-trust key and the random code to generate a hardware-trust result, and transferring the hardware-trust result over the SDN southbound interface to the trust controller.

10. The method of claim 1 wherein:
    transferring the hardware-trust data comprises the trust controller transferring a control system digital certificate over the SDN southbound interface to the trust processor; and
    transferring the additional hardware-trust data comprises the trust processor transferring a data-plane machine digital certificate over the SDN southbound interface to the trust controller.

11. A Software-Defined Network (SDN) data communication system to support hardware-trust and process user data traffic comprising:

a trust controller in an SDN control system, comprising a processor executing instructions stored in a memory, configured to transfer hardware-trust data to a trust processor in an SDN data-plane machine over an SDN southbound interface to maintain hardware-trust with the SDN data-plane machine;

the trust processor in the SDN data-plane machine configured to transfer additional hardware-trust data to the trust controller over the SDN southbound interface to maintain the hardware trust with the SDN control system;

a flow controller in the SDN control system configured to transfer a Flow Description Table (FDT) modification to a flow processor in the SDN data-plane machine over the SDN southbound interface and transfer an FDT modification notice to the trust controller;

the trust controller in the SDN control system configured to transfer FDT security data to the trust processor over the SDN southbound interface to authorize an FDT change responsive to the FDT modification notice;

the trust processor in the SDN data-plane machine configured to transfer FDT authorization data to the flow processor responsive to the FDT security data from the trust controller; and the flow processor in the SDN data-plane machine configured to authorize the FDT modification based on the FDT authorization data from the trust processor, modify an FDT based on the FDT modification and in response to the successful FDT authorization, and process the user data traffic using the modified FDT.

12. The SDN data communication system of claim 11 further comprising:

the trust controller in the SDN control system configured to transfer threat data over the SDN southbound interface to the trust processor;

the trust processor in the SDN data-plane machine configured to transfer the threat data to the flow processor; and the flow processor in the SDN data-plane machine configured to modify a Threat Description Table (TDT) responsive to the threat data and filter the user data traffic using the modified TDT.

13. The SDN data communication system of claim 12 wherein the flow processor in the SDN data-plane machine is configured to process the user data traffic based on the FDT by forwarding a first flow of user data packets.

14. The SDN data communication system of claim 12 wherein the flow processor in the SDN data-plane machine is configured to filter the user data traffic based on the TDT by blocking a second flow of user data packets.

15. The SDN data communication system of claim 14 wherein the trust controller is configured to receive a flow threat notice from another SDN data-plane machine indicating a detected threat from the second flow of the user data packets and transfer the threat data to modify the TDT in response to the flow threat notice.

16. The SDN data communication system of claim 14 wherein the TDT comprises a portion of the FDT.

17. The SDN data communication system of claim 11 wherein the trust controller is configured to transfer an SDN data-plane machine notice to the trust processor over the SDN southbound interface responsive to a hardware-trust failure of another SDN data-plane machine.

18. The SDN data communication system of claim 11 wherein the trust controller is configured to transfer an SDN flow controller notice to the trust processor over the SDN southbound interface responsive to an unauthorized FDT modification attempt associated with another SDN flow controller.

19. The SDN data communication system of claim 11 wherein:

the trust controller is configured to transfer a random code over the SDN southbound interface to the trust processor; and the trust processor is configured to read a physically-embedded hardware-trust key, process the hardware-trust key and the random code to generate a hardware-trust result, and transfer the hardware-trust result over the SDN southbound interface to the trust controller.

20. The SDN data communication system of claim 11 wherein:

the trust controller is configured to transfer a control system digital certificate over the SDN southbound interface to the trust processor; and the trust processor is configured to transfer a data-plane machine digital certificate over the SDN southbound interface to the trust controller.

* * * * *